United States Patent [19]

Jordan et al.

[11] Patent Number: 4,514,426
[45] Date of Patent: Apr. 30, 1985

[54] PACKAGE AND METHOD FOR THE AUTOMATIC CONTROL OF THE DEGREE OF COOKING OF A CEREAL

[75] Inventors: J. Kirk Jordan, Franklin; Sandra L. Scherling, Nashville, both of Tenn.

[73] Assignee: Martha White Foods, Inc., Nashville, Tenn.

[21] Appl. No.: 517,674

[22] Filed: Jul. 27, 1983

[51] Int. Cl.³ .................. A23L 1/168; B65B 29/08; B65D 81/34
[52] U.S. Cl. .................. 426/113; 426/77; 426/84; 426/82; 426/110; 426/412; 426/415
[58] Field of Search ............ 426/113, 412, 415, 77–84, 426/110; 206/0.5

[56] References Cited

U.S. PATENT DOCUMENTS

| | | | |
|---|---|---|---|
| 2,138,358 | 11/1938 | Salfisberg | 426/77 |
| 2,193,974 | 3/1940 | Luckhaupt | 426/77 |
| 2,801,736 | 8/1957 | Grow | 426/84 |
| 2,817,596 | 12/1957 | Schur | 426/84 |
| 2,969,292 | 1/1961 | Heller | 426/113 |
| 3,081,174 | 3/1963 | Gay | 426/113 |
| 3,183,096 | 5/1965 | Hiscock | 426/84 |
| 3,293,048 | 12/1966 | Kitterman | 426/113 |
| 3,395,025 | 7/1968 | Hermanson | 426/113 |
| 3,615,712 | 10/1971 | Keller | 426/113 |
| 3,640,727 | 2/1972 | Heusinkveld | 426/77 |
| 3,689,291 | 9/1972 | Draper | 426/113 |

FOREIGN PATENT DOCUMENTS

| | | | |
|---|---|---|---|
| 1049685 | 8/1955 | Fed. Rep. of Germany | 426/113 |
| 1267811 | 5/1968 | Fed. Rep. of Germany | 426/128 |
| 48-28064 | 8/1973 | Japan | 426/113 |
| 51-33178 | 9/1976 | Japan | 426/412 |
| 54-54794 | 1/1979 | Japan | 426/77 |
| 661820 | 11/1951 | United Kingdom | 426/113 |
| 965498 | 7/1964 | United Kingdom | 426/113 |
| 1013665 | 12/1965 | United Kingdom | 206/0.5 |

OTHER PUBLICATIONS

Food Engineering, 6/59, p.27.
Food Engineering, 9/57, p. 83.

Primary Examiner—Steven Weinstein
Attorney, Agent, or Firm—Murray, Whisenhunt & Ferguson

[57] ABSTRACT

The present invention relates to a package for the automatic control of the degree of cooking of a cereal, and more particularly, to cereal cooked in hot water. The invention also relates to a method for the automatic control of the degree of cooking of a cereal, as well as to a container for the automatic control of the degree of cooking of a cereal.

39 Claims, 2 Drawing Figures

PACKAGE AND METHOD FOR THE AUTOMATIC CONTROL OF THE DEGREE OF COOKING OF A CEREAL

The present invention relates to a package for the automatic control of the degree of cooking of a cereal, and more particularly, to cereal cooked in hot water. The invention also relates to a method for the automatic control of the degree of cooking of a cereal, as well as to a container for the automatic control of the degree of cooking of a cereal.

BACKGROUND OF THE INVENTION

Cereals are a staple food item and are nutritionally important, in that cereals are sources of energy, fiber and various minerals and vitamins. Cereals are consumed both as a cold cereal and as a hot cereal. For example, cereals are consumed as a cold cereal in the form of bread, cakes and cold breakfast foods, while hot cereals are consumed in the form of a porridge or mush, and the like. Greater amounts of cereal are consumed in the cold form, since the hot form requires preparation immediately prior to consuming, and that preparation is both time consuming and difficult to perform.

In this latter regard, when a cereal is cooked to provide that cereal in a hot form for immediate consumption, the cereal must be cooked in an amount of water which is carefully proportioned for the amount of cereal being cooked, and it must also be cooked for a very specific time. Otherwise, the cereal becomes unpalatable, either by virtue of being too "runny" or too "thick" or undercooked or overcooked. In addition, if the cooked cereal is not consumed quite soon after cooking, the consistency of the cooked cereal materially changes and, in addition, will form a film or "skin" on the surface thereof. Thus, the cooked cereal will quite rapidly become unpalatable.

For the above reasons, the popularity of cooked cereal is not nearly as great as the nutritional advantages thereof justify. The art has sought means of avoiding or at least in part mitigating some of these difficulties in connection with cooked cereals, but the art has not provided an adequate solution thereto. For example, cereals are available in the "quick" cooking form, where the cereals have been partially gelatinized (partially cooked) such that the cooking time for the cereal is considerably reduced. Thus, the householder can more quickly cook the cereal and reduce the time period of careful attention to the cooking thereof. However, this approach still requires very careful proportioning of the water to the cereal for cooking, and this approach does not avoid the difficulties and unpalatable results of undercooking or overcooking, nor does it avoid the necessity of promptly serving the cooked cereal.

Another approach to the art is to provide the cereal in an "instant" form where the cereal has been essentially fully cooked (essentially gelatinized) and then dehydrated; and the cereal can be prepared for serving simply by mixing with hot water. However, again, the amount of water used with the cereal must be carefully proportioned, and, again, the cereal must be served promptly after preparation. Further, when this essentially fully cooked cereal is mixed with hot water, the texture and taste of the cereal are considerably different from a freshly cooked cereal and that texture and taste are not acceptable to a majority of the hot cereal consuming public.

Finally, another approach in the art is that of providing the cereal in a cooking bag. The purpose of this bag is solely to contain the cereal while being cooked in an excess of boiling water so that the cereal can be removed from the boiling water after being appropriately cooked and this approach avoids the necessity of carefully proportioning the amount of cereal to the water for cooking. However, this approach is considerably limited in regard to the cereals that can be so processed. Basically, this approach is applicable only to products such as long grain rice, in which the cereal grains are consumed as discrete grain particles, separate and apart from the starch and protein matrix generated during boiling of the cereal product. This approach allows water to percolate and diffuse throughout the bag during the entire cooking process, consequently allowing the dissolved solids to flow out of the cooking bag and into the excess cooking water. This approach is not applicable to typical hot breakfast cereals such as oatmeal, farina, corn grits, etc., in which the discrete cereal particles are uniformly dispersed in a creamy thick matrix of solubilized starches and proteins, which matrix is an integral part of the cereal product such that the separation by diffusion and subsequent loss of said matrix from the cereal inside the bag would materially alter and substantially harm the palatability and nutritional properties of the hot breakfast-type cereal. In addition, this approach will not avoid either undercooking or overcooking, and again the cereal must be served immediately after cooking.

It would therefore be of considerable advantage to the art to provide a package and method for cooking a wide variety of cereals wherein the cooking can be achieved without any critical proportioning of water to cereal. It would also be of advantage to provide such package and method which will also prevent both overcooking and undercooking, even with extended cooking times, and which will allow the cooked cereal to remain hot for extended periods of time without overcooking, significant changes in consistency, forming a "skin", and thus, avoiding the necessity for serving immediately after cooking. It would also be of advantage to the art to provide a container for such cooking such that the container can provide those most desired advantages.

BRIEF DESCRIPTION OF THE INVENTION

The present invention provides the foregoing described advantages and the invention is based on three primary discoveries, and several subsidiary discoveries.

First, it has been discovered that the overcooking of cereal can be essentially eliminated if the cooked cereal is placed in a condition such that substantially no more hot water can contact the cereal after it has been cooked while at the same time no water incorporated in the cereal is allowed to be dessicated from the cereal. Cooking of cereal involves gelatinization of the cereal starch, and in order for additional cooling to take place, water must be supplied to the cereal in order to continue that gelatinization and hydration of the starches and to facilitate the disorganization of the starch-protein matrix. Thus, by providing that after the cooking has been completed substantially no more water is available to the cereal and no dessication of water is possible from the cereal, overcooking of the cereal is avoided, even though the cereal remains at cooking temperatures for extended periods of time.

Second, it has been discovered that when a cereal has reached its fully cooked state it has also expanded in volume (by the process of gelatinization) to a predictable volume. Thus, it has also been discovered that this predictable fully cooked volume of the cereal is a very accurate means of determining when the cereal has been fully cooked and at what time further cooking of the cereal should be ceased.

Third, it has been discovered that if cereal is cooked in a porous container surrounded by an excess volume of water, as the cooking continues the cereal will expand into the volume of the porous container. Thus, when the volume of the container is proportioned to the amount of uncooked cereal placed in the container such that the cooked cereal expands to fill the volume of the container, that expanded volume of cooked cereal is capable of filling and clogging the pores of that container, and effectively sealing the container so as to prevent further water from entering the container and cereal. Thus, the cooking (gelatinization) of the cereal ceases, as explained above.

As subsidiary discoveries, it has been found that there are critical relationships between the amount of uncooked cereal contained in the container, the porosity of the container and the volume of the container. However, it has further been found that these critical relationships are very easy to determine for any particular cereal. Accordingly, the present invention is applicable to a wide variety of cereals and states thereof, e.g. partially cooked, precooked and the like.

As a further subsidiary discovery, it has been found that once the cereal is cooked and expanded to the volume of the container, thus preventing substantial further water for gelatinization from entering the container, the cooked cereal may remain in the hot water for extended periods of time without overcooking. Similarly, the cereal may remain in the hot water for extended periods of time at the proper serving temperature, and the cooked cereal may be served at that serving temperature at any convenient time without suffering the disadvantages noted above.

Finally, it has been discovered that with the present invention the householder need not carefully proportion the water or the cereal, need not carefully control the cooking time, and can delay serving of the cereal for extended periods of time even though the cereal remains at the cooking temperature.

Thus, the present invention provides a package, method and container for the automatic control of the degree of cooking of a cereal disposed in an excess volume of hot water, and the invention both provides the advantages and avoids the disadvantages of cooked cereal, as discussed above.

Briefly stated, in connection with the package, the present invention provides a package for the automatic control of the degree of cooking of a cereal disposed in an excess volume of hot water. The package comprises a porous closed container having a predetermined volume and made of a hot water resistant material such that the container may be disposed in the excess volume of hot water for extended periods of time without substantial deterioration thereof. A predetermined amount of uncooked granular cereal is disposed within the container. The container has pore sizes such that a substantial amount of the uncooked granular cereal disposed in the container cannot pass through the pores, but the pores are of a size such that water from the excess volume of hot water may freely pass through the pores when the container is disposed in the excess volume of hot water. The predetermined amount of uncooked granular cereal is such that when the cereal is substantially fully cooked and expanded by sufficient contact with hot water flowing from the excess volume of hot water, through the pores and into the cereal, the substantially fully cooked and expanded cereal is of a volume which is at least substantially the same as the predetermined volume of the container.

Thus, the substantially fully cooked and expanded cereal will substantially contact and close substantially all of the pores of the container such that no substantial amount of additional hot water may pass from the excess volume of hot water into the cereal. Thereby, the cooking of the cereal substantially ceases without removal of the container and the cooked cereal therein from the excess volume of hot water.

By virtue of the hot water not being able to further contact the cooked cereal (which results in a ceasing of the cooking) the cooked cereal may remain in the hot water for extended periods of time without overcooking or changing consistency or forming a "skin".

Thus, the householder does not need to either accurately proportion the water or the cereal, or monitor the cooking time, or serve the cooked cereal immediately after cooking, and in addition does not require any stirring or other attention to the cereal during cooking.

DETAILED DESCRIPTION OF THE INVENTION

Figure 1:
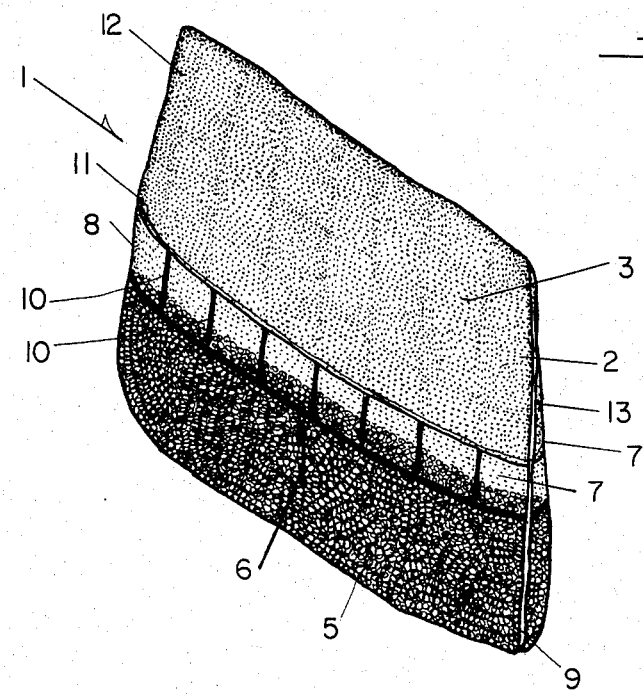
FIG. 1 is a perspective view of a suitable container according to the present invention, in which container is disposed a predetermined amount of uncooked cereal.
Figure 2:
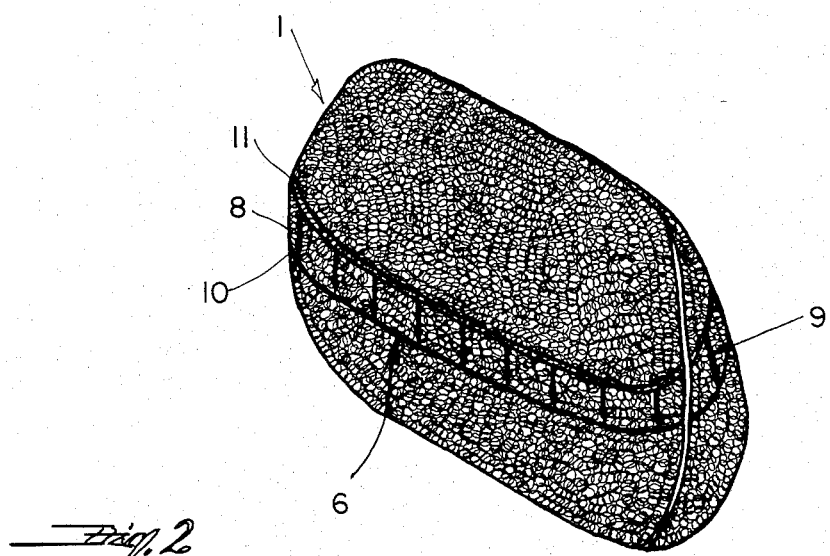
FIG. 2 is the same container as FIG. 1 but showing the shape of the container when the cereal within the container has been fully cooked and expanded to at least the volume of the container.

From the above brief description of the invention, it can be understood that the present package, method and container provide an automatic control of a degree of cooking of cereal disposed in an excess volume of hot water. In this regard the term "automatic control" means that once the container has been disposed in the excess volume of hot water, no other control by the householder in regard to the cooking is required and the combination of the container and the cereal automatically, themselves, control the degree of cooking of the cereal. Further, the term "excess volume of hot water" means that the amount of water used in the present invention is in excess of that which would be used for cooking the cereal when the cereal and water are mixed and cooked together, in the traditional manner of cooking a cereal. For example, a usual ratio of water to be mixed with a cereal for traditional cooking to produce usual consistencies is four volumes of water to one volume of cereal. When the cereal is fully cooked (but not overcooked) with that ratio, the cereal has a palatable consistency. In the present invention, however, the amount of water onsiderably in excess of that ratio of 4 to 1 and may be as large as desired, since the particular excess of water has no bearing on the automatic control of the degree of cooking. Thus, for example, a single serving of uncooked cereal may have a volume of, for example, 25 cubic centimeters, but conveniently with the present invention, that amount of cereal may be cooked in a volume of hot water of at least a liter, and very often as much as 2 or 3 liters. Stated another way, a relatively small container, for example measuring approximately 8½ by 10½ centimeters and containing approximately 25 cubic centimeters of uncooked cereal can be cooked in a pot of boiling water containing 1 or 3 liters, or more.

It should also be appreciated in connection with the term "hot water" that this term has reference to water of a temperature sufficient to cook the cereal, i.e. gelatinize the cereal, which temperature will vary somewhat with the cereal, but normally will be at least about 75° C., and more usually at least about 85° C., but most often will be near the boiling point for convenience sake, i.e. up to about 100° C. In addition, it should also be understood that the term "hot water" means that the cooking liquid must contain the hot water, but the cooking liquid can be other than water per se, i.e. milk, milk products and mixtures of milk and water, particularly when cooked at the lower temperatures, although this will not normally be the case.

Finally, in connection with general considerations before discussing the details of the container, it should be clearly understood that the present invention is applicable to all cereals, including barley, corn, oats, rice and wheat, and is not limited to certain cereals, as was the case of much of the prior art. In addition, the present invention is applicable to raw or milled cereals, cereals in grit form or cracked form, rolled cereals and partially cooked or fully cooked and dehydrated cereals. In addition, the cereals may contain ordinary flavorings, such as one or more of sugar, salt, spices, fruit (usually dried) and nuts.

Turning now to the details of the container, the container may be in any shape and of any configuration desired, since both of these factors have no critical bearing on the present invention. However, the container must be porous, as explained more fully hereinafter, and it must be closed when the container is ready for disposing in the hot water. In this sense, "closed" only means that the container is continuous to the extent that the cereal will not spill from the container when disposed in the hot water. In addition, the container must be made of a hot water resistant material such that the container may be disposed in the excess volume of hot water for extended periods of time without substantial deterioration thereof. More usually, the hot water resistant material should be resistant to boiling water and be made of a natural or synthetic material.

In this latter regard, the pores of the container may be constituted by natural openings in the resistant material. For example the resistant material may be a hot water resistant paper and the pores are constituted by the natural openings of the paper. Alternatively, the pores of the container may be constituted by openings fabricated into the resistant material, for example where the resistant material is a woven or non-woven fabric and the openings are constituted by the openings inherent produced in fabricating the fabric. Preferably, fabrics of this nature are composed of synthetic yarns, e.g. polyethylene, polypropylene, nylon, dacron and the like. Yet alternatively, the pores of the container may be constituted by openings perforated in a resistant material, for example where the resistant material is a film, e.g. a plastic film, and the openings are constituted by perforations through the film.

Various materials which constitute the resistant material will differ in their abilities to not substantially deteriorate for extended periods of time in the hot water. For example, the above-noted paper materials will deteriorate much more rapidly than will, for example, fabrics made of synthetic yarns. This deterioration is not particularly critical, but in any event, the resistant material should be chosen so that it may be disposed in boiling water for up to one hour without substantial deterioration thereof, and more usually up to 2 or 3 hours or more. This provides the householder with considerable leeway in regard to when the cereal is cooked and when the cereal is consumed.

The porous container must have pore sizes such that a substantial amount of uncooked granular cereal disposed in the container cannot pass through the pores but the pores must have sizes such that water from the excess volume of hot water may freely pass through the pores when the container is disposed in the excess volume of hot water. In this regard, for example, when the cereal is milled, the granular size of the milled cereal will vary somewhat, and some of the milling fines may pass through those pores, although the great majority of the cereal will not. It is in this sense that the pores are sized such that a "substantial amount" of the uncooked granular cereal will not pass through the pores. Similarly, even when unmilled cereal is used, the grain size of the cereal can vary somewhat, and some rather insubstantial amount of immature small grains may pass through the pores.

As indicated above, all forms of granular cereal may be used, including the forms of natural grains of cereal or in the form of rolled or ground particles thereof. These will, of course, have different geometric shapes and if desired, the pores may be shaped in a non-complementary manner to reduce the amount of cereal fines that can pass through the pores. Thus, if the cereal is in a rolled form, one would ordinarily not choose pores with rectangular shapes, but would more normally choose round shapes. On the other hand, when the cereal is in a grain form of generally eliptical shape, one might choose pores of rectangular shape. Likewise, when the cereal is in a ground form, one might choose smaller pores than would be chosen for a granular cereal which is not ground and hence in a larger particle size. Generally speaking, however, the smallest particle size of a cereal which is cooked is in the form of grit. A grit, of course, is the coarsely milled fraction of a cereal grain and, generally speaking is of relatively uniform particle size, the finer particles of milling having been removed by sifting. The pore sizes discussed below, are particularly relevant to the grit form, since when the pores will substantially contain the grit form, they will contain essentially all cereals.

Thus, generally speaking, the average pore diameter is less than about 2 mm.. and more preferably is less than about 1 mm., although a pore diameter of less than about 0.5 mm. is preferred. On the other hand, usually there is no necessity to have pore sizes that are quite small and the average pore diameter will normally be greater than about 0.1 mm. and more usually greater than about 0.2 mm., although these lower pore sizes are not narrowly critical.

The overall porosity of the container will, of course, vary with the pore size and number of pores. Since the porosity of the container only affects the rate in which the water passes through the container, and since for most ordinary porous materials that rate will be more than necessary, the actual porosity of the container is not narrowly critical. However, commercially available porous films (polyethylene) normally have porosities of less than about 500 (by the modified ASTM air permeability method) and more usually less than about 400, and these porosities are quite satisfactory. On the other hand, these commercial films will normally have porosities of at least about 200, and more usually at least about 300 which is more than sufficient porosity. It should be fully appreciated, however, that the porosity is not critical and it is only necessary that there be sufficient porosity that enough water will pass through the container to fully cook the cereal in a reasonable time, e.g. within one hour. Beyond this the actual porosity is relatively immaterial. Thus, the porosity may vary from as great as that equal to an open netting or screening having openings sized just small enough to contain the cereal to as low as as that equal to a water permeable plastic membrane, e.g. a foamed membrane. Nevertheless, for convenience, any material may be tested by a water permeability test, described in Example 1, and water permeabilities greater than 20 ml/minute/square centimeter are more than adequate.

As noted above, a predetermined amount of uncooked granular cereal is disposed within the container. Likewise, the container has a predetermined volume. These relationships are necessary, since, as explained above, the fully cooked and expanded cereal should at least substantially fill the volume of the container, and thus, close off the pores from further ingress of hot water from the excess volume of hot water. However, in this regard the term volume of the container is intended to mean the volume of the container when the cereal is fully cooked. As will be appreciated, the volume of the container may be a set constant volume, that is the container has rigid walls and its volume neither increases or decreases during the cooking process. On the other hand, the container may be in the form of a flexible bag of the like (see FIG. 1) and the volume of the bag will vary with the particular configuration of the flexible walls in any one disposition thereof. However, as the cereal is cooked and expands, it expands the flexible walls of that bag container and ultimately when the cereal is fully cooked the bag will be expanded to its maximum volume. Thus, in the case of a flexible bag or the like, the volume of the container is the volume of the flexible bag when the flexible bag is fully expanded by the fully cooked and expanded cereal. It is in this sense that the term "predetermined volume" is used in the present specification and claims.

The "predetermined amount" of uncooked granular cereal disposed in the container is such that when the cereal is substantially fully cooked and expanded by sufficient contact with hot water flowing from the excess volume of hot water, through the pores and into the cereal, the substantially fully cooked and expanded cereal is of a volume which is at least substantially the same as the predetermined volume of the container. This "predetermined amount" of the cereal can be easily ascertained. Thus, by simple experiment, one can determine the volume of a fully cooked cereal on a per unit basis of the uncooked cereal, e.g. by the traditional cooking method. While this will vary from cereal to cereal, and from form to form thereof, generally speaking, the volume of the fully cooked cereal is somewhere between about 4 times and 7 times the volume of the uncooked cereal. This is more precisely predicted on the basis of the volume of the fully cooked cereal per unit weight of the uncooked cereal, since this means of determination eliminates the differences accounted to the voids between the granular particles of the uncooked cereal.

On the above basis, the ratio of the predetermined volume of the container, in cubic centimeters, to weight of uncooked cereal, in grams, disposed within the container is from 3:1 to 8:1 but much more often that ratio is between 4:1 and 7:1, and for most forms of cereals will be between 5:1 and 6:1. As a matter of fact, for most of the normally desired consistencies of cooked cereals that ratio is optimally about 5.6:1.

In any event, the predetermined volume of the container and the predetermined amount of the uncooked granular cereal is so chosen that the cooked and expanded cereal has a volume which is at least substantially the same as the predetermined volume of the container. This provides that the substantially fully cooked and expanded cereal will substantially contact and substantially close substantially all of the pores of the container such that no substantial amount of additional hot water may pass from the excess volume of hot water into the cereal and the cooking of the cereal thereby substantially ceases without removal of a container and the cooked cereal therein from the excess volume of hot water. It will be appreciated in this regard that when the cereal contacts the pores, the expansion of the cereal in the container presses the cooking cereal against the pores and acts as a valve to close off those pores. With the pores so closed off, no substantial further amount of hot water will enter into the cooking cereal. Since, as explained above, water is necessary for further gelatinization of the cereal (cooking), the closing off of the pores and the attendant preventing a further ingress of water into the cereal automatically stops the cooking process.

By so providing the predetermined amount of cereal and so providing the predetermined volume of the container such that the cereal expands and substantially fills the container and closes the pores at that amount of cooking where the cereal has been essentially fully cooked, the cooking process is automatically ceased and will not allow the cereal to substantially overcook.

The invention, therefore, provides most considerable advantages to the householder. Thus, the householder need not measure any water whatsoever, but simply fill a convenient pot with water to any reasonably desired level. In this regard, the amount of water should be sufficient to allow the container to be fully disposed in the water and to insure that the container may remain in boiling water for long periods of time without sufficient water being boiled away as to interfere with the cooked cereal in the container, e.g. burn the cereal or the like. Therefore, more as a convenience rather than a necessity, the excess volume of the hot water into which the container is disposed may conveniently be constituted by volume of hot water at least twice the volume required to fully cook and expand the cereal, but far more preferably at least 4 times and more preferably at least 6 to 10 times that volume will be used to insure no difficulty as explained above. However, prudent observation of energy and time conservation may restrain water volumes much in excess of the stated ranges because greater water levels require additional energy input and usually a longer time to raise the temperature of the water above the minimum cooking (gelatinization) temperature, with no particular attendant value added to the palatability of the cooked product.

Another advantage is that the householder need not accurately measure the amount of cereal being cooked. Thus, the householder simply takes a container with the predetermined amount of cereal therein and places that container in that convenient pot of water, as explained above. The water may be either at ambient temperature or at a hotter temperature or at the boiling point, and this makes no difference, since the cooking of the cereal is automatic.

A further advantage is that the householder can easily determine when the cereal has been fully cooked and need not inspect or attend to the cooking cereal, e.g. by stirring or the like as is the usual case. Thus, when the cereal is fully cooked, it will have expanded and substantially completely filled the container. When the container is filled, the householder knows that the cereal has been fully cooked and the container with the cooked cereal therein may be removed from the hot water. Therefore, the householder need not time the cooking at all but can rely entirely on a casual visual inspection to see when the container is filled with the cooked cereal. In the case of a flexible bag, as explained above, this is most convenient, since the householder can see that the volume of the bag has increased with the expanded cereal and when that flexible bag has bulged to its maximum volume, the householder knows that the cereal has been fully cooked.

On the other hand, and as another advantage, the householder need not be concerned with determining the exact moment when the cereal has been fully cooked. Or, stated another way, the householder need not be careful to remove the ontainer from the hot water at the exact moment when the cereal has been fully cooked. This is because, as explained above, the volume of the uncooked cereal disposed in the container is such that upon being fully cooked and expanded the pores of the container are sufficiently closed that the cereal disposed in the container may remain in the excess volume of hot water for an extended time period, i.e. up to at least 3 hours, without being substantially overcooked. However, more usually, the fully cooked cereal should be removed from the hot water within a time period up to 2 hours, and more usually for a time period of up to one hour, but more preferably within a time period up to one-half hour, since some small amounts of continued cooking will take place. These small amounts, however, are not sufficient to substantially adversely affect the texture of the cereal.

In view of the above, a further advantage of the present invention is provided to the householder. Thus, the cereal may be cooked at any convenient time and by virtue of the fact that it may remain in the hot water for extended periods of time without overcooking, it can be served at much later than the cooking time. Thus, for the householder who has a family who eats breakfast at different times, the householder may easily prepare the cereal at an earlier time and serve the various members of the household at discontinuous times without concern that the cereal may become overcooked or unpalatably cold.

A further advantage of the present invention is the elimination of the skin or film of cereal material that forms on top of cooked cereal at the air-cereal interface. This skin which tends to thicken and toughen within minutes after the cereal is cooked, is often combatted in both restaurant and home settings by pouring an oil (such as butter or margarine) over the top of the cooked cereal; or by covering the cooked cereal with an air-impervious barrier, such as a film of saran, polyethylene, or other plastic; or by covering the cooked cereal with a liquid such as milk; or by other means, all of which are an effort to minimize the contact of air with the cereal surface. In the case of the present invention, contact between the air and the cereal is substantially eliminated inside the cooking pot by the combined presence of both the excess water and the container of the invention. Further, the air-cereal contact is minimized outside of the water after cooking by the unopened container, so that the skinning problem is eliminated and the cereal pours out of the container free of a thick tough skin that is characteristic of traditionally cooked hot cereals. The skinning process is free to commence only after the cereal is removed from the container and poured into a bowl, but by then the consumer is ready to add milk or butter which again minimizes the skinning effect. In no case is there time for the kind of skinning to form that is characteristic of certain hot cereals maintained on a steam table for buffet style meals and which cereals are exposed to the air for substantial parts of an hour or more and which are often stirred by the steward to mix the skinned top layer into the rest of the hot cereal, resulting in lumps of skinned cereal blended throughout the food. In the case of the present invention, cooked cereal in the container may be maintained on a steam table or food warmer for hours protected from skinning and dessication by the container.

Thus, in summary, the method for the automatic control of the degree of cooking of the cereal is that of simply disposing the package, as described above, and an excess volume of hot water, allowing the package to remain in that hot water until fully cooked, removing the package from the hot water, opening the package and recovering the cooked cereal for serving. Most cereals will require at least about 4 minutes before cooking , and some cereals will require 6 to 8 minutes or even for whole grain cereals up to 20 to 30 minutes or even a little more. However, as explained, no timing is required, since the householder can easily determine when the cereal is fully cooked. Further, in this regard, as explained above, the householder may remove the package from the hot water, open and serve its contents, at any convenient time, without overcooking the cereal.

Turning now to the drawings, which show a preferred form of the container, as noted above, the container provides for the automatic control of the degree of cooking of a cereal disposed in an excess volume of hot water. The container is a closed wall vessel, generally, 1, made of a porous hot water resistant material 2 having pores 3, which pores have sizes such that a substantial amount of the uncooked granular cereal 5, contained in the vessel, cannot pass through the pores 3. On the other hand, the pores will freely pass water therethrough. The vessel 1 also has a handle 6 disposed on at least one of the walls 7 of the vessel. In a preferred embodiment, as shown in the drawings, the handle is constituted by an excess portion 8 of the resistant material 2 and being in the form of a flap 9. That flap is of a size that the flap may be engaged by a cooking utensil and lifted and manuevered thereby.

This is quite convenient to the householder, since the householder can place the container in the hot water without danger of burns by simply inserting a cooking utensil, e.g. a fork, under flap 9 and lifting and placing the vessel 1 in hot water. After the cereal is fully cooked, and when it is desired to remove the vessel from the hot water, again, a fork or the like is placed under flap 9 and the vessel is removed from the hot water. The vessel is then opened either by cutting the vessel at any desired point with a knife or scissors, while, conveniently, holding the vessel by the fork under flap 9. In the drawings, the arrows 10 direct the householder to the flap and the underside thereof where the fork is conveniently placed for lifting and manuevering the vessel 1.

The container may be made by any desired means and methods, but for the preferred embodiment as shown in the drawings, the container is made simply by seaming, e.g. stitching or heat sealing or the like, along the main seal 11 which forms the resistant material into a cylindrical form. Of course, as noted above, to produce the flap, an excess portion of the resistant material remains downwardly from main seal 11 so as to form the handle in the vessel. One edge, for example edge 12, is then seamed, e.g. stitched, heat sealed, glued and the like, so as to produce a pouch with one open end (the open end in this case being at the right of the drawings). Such a pouch is adaptable to automatic filling machines, and the cereal may be filled into the pouch via the open end and that end again seamed, e.g. heat sealing, stitching, gluing and the like at 13 to close the pouch.

The handle will be integrally formed, since seaming at 12 and 13 will also seam the excess portion 9 along those seaming edges and provide the flap attached to the vessel.

The invention will now be illustrated in connection with the following examples. However, it is to be fully understood that the invention is not limited to the examples, but extends to the scope of the foregoing disclosure and following claims. In the examples, as well as in the specification and claims, all weights and volumes are in grams and centimeters and all temperatures are in centigrade, unless otherwise indicated.

EXAMPLE 1—PREPARATION OF CONTAINER

The film used in this example was a blended low and medium density polyethylene film in roll form (Vis-Queen Film Products Division, Richmond, VA—designated VFF 2226). The film was 0.0038 cm. thick and 25.4 cm. wide. The film had an average water permeability of about 275 ml/min./cm$^2$ and determined by the following test. A circular test sample of the film with an area of 5 cm$^2$ is supplied with tap water aat ambient temperature and at a constant head of 15 cm. In the test the film is supported for flow of water therethrough without stretching or wrinkling the film in the support. Water supplied with the constant 15 cm. head is flowed through the film and the test is repreated several times with several fresh test samples (porosity can vary across a film width). The average flow in ml./min./cm$^2$ is then determined. For comparison purposes the film had a modified ASTM air permeability of about 300-400.

The film was rolled on 20.3 cm. cores to an outside roll diameter of about 50 cm. (smooth side out). The film was inserted onto the horizontal spool-holding spindle of a Triangle vertical form-and-fill bag machine model TC 6PD equipped with a model P 30 volumetric fillers. (Triangle Package Machine Company, Chicago, Ill.) The film was threaded through the mechanical tension arms and over the film collar, which projects the edges of the flat film forward and inward to form a hollow cylinder. The cylinder of film formed by the collar was conveyed downward, snugly wrapping a smooth metal cylinder below the forming collar. The metal cylinder had an outside circumference slightly less than 23 cm., such that when the film, which had a 25.4 cm. flat width, was wrapped snugly around the outside of the metal cylinder, a 2.5 cm. overlap of the film edges resulted. That is, one vertical edge of the film overlapped the other vertical edge. Furthermore, the film forming collar above the metal cylinder had been rotated approximately 20° to 30° on the axis of the metal cylinder in such a manner as to effect the formation of the overlap 20° to 30° away from the vertical centerline of the metal cylinder as viewed in the context of the entire form-and-fill machine. The direction of the transverse rotation of the collar was away from the top overlap edge of the film. Similarly, a bar running the front length of the vertical metal cylinder and containing an uninsulated resistance wire through which an electic current could be pulsed, was displaced in the same direction and approximately at the same angle from the cylinder centerline, such that the exposed resistance wire could be aligned with the underlapped edge of the film, that is, the film edge on the inside of the overlap of the film cylinder. The foregoing process of forming a film cylinder with a 2.5 cm. overlap 20° to 30° transverse from the mechanical centerline of the metal cylinder, was performed so that the film cylinder could be heat sealed near the edge of the film inside the overlap. In this process the film edge on the outside of the overlap lies approximately along the centerline of the vertical cylinder, while the film edge on the inside of the overlap lies approximately 20° to 30° away from the centerline. A vertical heat seal is formed along that part of the length of the film cylinder lying between the metal cylinder and the exposed resistance wire mounted externally on the bar paralleling and slightly spaced away from the cylinder. The bar is pneumatically conveyed a distance of approximately 2.5 cm. until is rests firmly against the length of the overlap of film. For approximately one second an alternating current of electricity was impulsed across the resistance wire, heating the wire so that the juxtaposed film overlap was momentarily heated above the 124° C. melting point of the polyethylene film, causing the film near the edge of the underlap side to anneal with the film situated about 2.5 cm. or less from the overlapped edge of the film. After approximately 1 second the heat-seal bar was pneumatically removed from the film, while air jets located in the bar blew cooling air on the melted film. Teflon film or tape may be placed between the exposed wire and the film to minimize adherence of the molten polyethylene film to the wire. As soon as the film temperature fell below its melting point, the previously liquified polyethylene solidified, creating a sealed film cylinder with an attached vertical flap approximately 2 cm. deep. Below the end of the metal cylinder is a paired set of heat sealing bars configured perpendicularly to the axis of the metal cylinder. The bars, one before and one behind the bottom of the metal cylinder, pneumatically converge and close as jaws directly below the bottom of the metal cylinder, and in so moving, snugly grasp the film cylinder hanging below the end of the metal cylinder. One of the bars contains a Teflon covered resistance wire which, as previously described, can form a heat seal in the film, thereby closing the bottom end of the film cylinder.

EXAMPLE 2—FILLING CONTAINER

Degerminated white corn grits located in a hopper above the form-and-fill machinery, described above, was conveyed by gravity flow into the volumetric cups at the top of the machine. These cups were mechanically adjusted so that they metered a constant weight of grits, plus-or-minus 0.75 grams, for conveyance into the containers. In a continuous-batch cycling, each cup was overfilled with grits, scraped level on top by a straight edge, and then the grits were dropped by gravity flow out the bottom of the cup into the container being formed below the metal film-forming cylinder. The metal cylinder on which the film had been formed was a hollow tube through which the grits were shunted into the closed end of the film cylinder located at the bottom end of the metal cylinder. As soon as the charge of grits, in this case, about 28.4 grams in weight had hit the sealed end of the film cylinder, the opened heat sealing jaws move vertically up along the film cylinder a predetermined distance, in this case about 9.5 cm. to form a container in the form of a bag having an inside height of 8.6 cm., then converged and closed over the film cylinder to form a top heat seal for the bag. During the time the heat-seal jaws were closed, the polyethylene close to the resistance wire melted, forming a molten seal between the two film surfaces. Because the bag below the jaws had been filled with grits, the force of gravity acting on the molten polyethylene below the heat sealing wire caused the polymer to pull away from the wire, detaching the intact bag from the end of the film cylinder. Meanwhile, the polyethylene immediately above the heated wire became molten such that when the jaws subsequently separated and cooling air was blown over the film a bottom seal for the film cylinder was formed. During the approximate second that the heat-seal jaws were closed, a second set of non-sealing, grasping jaws located above the heat-sealing jaws, clamped the film cylinder below the metal forming cylinder, and the entire closed jaws assembly moved vertically down about 9.5 cm., reciprocating the earlier upward motion of the opened jaws. This downward stroke advanced the film a distance equal to the height of one bag in a move translating from the film in the jaws all the way back to the flat film on the roll. At the bottom of the jaws stroke, another charge of grits was deposited in the sealed end of the film cylinder and the sealing cycle was begun anew.

EXAMPLE 3-COOKING TESTS

Finished bags of grits that fell from the machine were conveyed to a collection point for packaging in cardboard packages. Three grits containing bags were randomly collected for weighing, and were determined to be within the specified limits previously described. At time zero, one bag of grits was placed in a pot containing about 8 liters of salted boiling water. Thirty minutes later, a second bag was added to the boiling water. After 50 minutes from time zero, a third bag was added. Also, at time zero about 28 grams of free flowing grits (not in a bag) was added to a second pot containing about 8 liters of salted, boiling water. Further, at time zero in about a 2 liter sauce pan, 1.5 cups of quick grits was stirred into 4.5 cups of salted boiling water (ratio of 3 V/V) according to package directions. The heat was lowered and a lid was placed over the pot to minimized dessication. Finally at 50 minutes from time zero, 1.5 cups of quick grits was stirred into 4.5 cups of salted boiling water and cooked according to package direction for 10 minutes.

The bags containing the grits were observed upon addition to the water to become thoroughly wetted within 10 seconds of addition and to float on top of the surface. The bags were flacid and boiling water was observed to percolate through the grits and around and through the bags. After 5 minutes, the bags floating just below the surface appeared to be about two-thirds full, and little percolation of water through the grits mass was observed, although water continued to move freely around the unfilled bag. After 10 minutes the bag floating just beneath the surface appeared to be nearly full with only a slight volume left to be filled. Granular grits appeared to fill nearly all the pores, but the pores on top of the bag were not as fully impacted with grains as those nearer the bottom. In those bags cooked longer than 10 minutes, the bags become fully distended or pillowed after 12 to 15 minutes. Thereafter, no observable change in the bags was observed.

In the pot containing 8 liters of boiling water and 28 grams of free-flowing grits, the grits dispersed immediately throughout the water upon addition to the pot. After two minutes the water became cloudy white making the discrete grits hard to see. After 10 minutes the water had become opaque white. After 60 minutes none of the original grits remained, having completely dissolved in the boiling water.

The grits cooked in the pot containing a 3 V/V ratio of grits to water, were fully cooked after 10 minutes. After 20 minutes cooking the grits were pasty in consistency, lacked flowability when placed on a plate and began to form a filmy surface on top. After 30 minutes, cracks began to form on the surface of the grits as they dried out. After 60 minutes, the grits were badly dissicated and burned around the bottom and sides of the pan. They were essentially inedible. The grits cooked for only 10 minutes were typical of properly cooked grits. They flowed into a circular pile when spooned onto a plate. They were slightly peaked in the center of a bowl. They had the characteristic mouth feel of corn grits, that is, soft-to-firm bits of corn residing in a gravy-like matrix of corn starch. None of the grits had hard cores that stick in molar teeth.

The grits cooked in the bag for 10 minutes were indistinguishable from the grits with 3 V/V ratio cooked an equal time in the pot. They flowed cleanly from the cut bag and had the same mouth feel and flavor as grits cooked in the sauce pan for 10 minutes. The grits cooked for 30 minutes were slightly soft to the tooth but unmistakable in their character as grits in texture and flavor. They flowed cleanly from bag onto the plate in a circular pattern. In this case, the grits were slightly less flowable than the 10 minute cooked grits, and more like grits cooked in a pot for 12 minutes. They had discrete grit particles with slightly firm, rather than very firm cores. The bag grits cooked 60 minutes contained soft grits particles in a slightly pasty, slightly thickened matrix of corn starch. They flowed smoothly from the cut bag, forming a circular outline with a markedly raised center. They were only slightly more cooked than the 30 minute cooked bag grits.

It will thus be seen that the invention provides the advantages described above while avoiding the above described disadvantages. However, it will also be appreciated that the providing of these advantages and the avoiding of these diadvantages may be relative. For example, if the predetermined volume of the container and the predetermined amount of uncooked cereal are chosen such that the fully cooked cereal does not expand sufficiently to substantially close all of the pores of the container, then the time that the fully cooked cereal may remain in the hot water without overcooking is, relative thereto, reduced. This, nevertheless is quite acceptable for some uses, e.g. in restaurants where maintaining the cooked cereal at serving temperatures for prolonged periods is not required, but the ability to cook the cereal without measuring the water or cereal is required. It is in this sense that the term "substantially" is used in the specification and claims, and the term is defined to mean that the conditions described are met to the extent that the benefits of the invention are at least partially obtained, even though not fully obtained.

It will also be appreciated that various modification of the foregoing specific disclosure will be most apparent to those skilled in the art. For example, the container may be closed with a releasable and reengageable closure, e.g. a "zip-lock" closure. Thus, the container may be reused, e.g. by a restaurant, where uncooked cereal is reloaded into a previously used container. Accordingly, the modifications are intended to be embraced by the spirit and scope of the annexed claims.

It is claimed:

1. A package containing cereal for the automatic control of the degree of cooking of cereal when said package containing said cereal is disposed in an excess volume of hot water, comprising:

(1) a porous closed container having a predetermined volume and made of a hot water resistant material such that the container may be disposed in said excess volume of hot water for extended periods of time without substantial deterioration thereof;

(2) a predetermined amount of uncooked granular cereal disposed within said container such that the ratio of the predetermined volume of the container when the cereal is fully cooked and the container, if flexible, is expanded to its maximum volume, in cubic centimeters, to the weight of uncooked cereal, in grams, disposed within the container is from 3:1 to 8:1;

said container having pore sizes such that a substantial amount of the uncooked granular cereal disposed in the container cannot pass through said pores, but said pores being of sizes such that water from the excess volume of hot water may freely pass through said pores when the container is disposed in said excess volume of hot water but wherein said pores will be substantially closed to the passage of water to said cereal after it is expanded and fully cooked;

said predetermined amount of uncooked granular cereal disposed within said container and said predetermined volume of said container when the cereal is fully cooked and said ratio therebetween is sufficient to allow for the cereal at a predetermined time to expand to a volume which is at least substantially the same as the predetermined volume of the container and the expansion of the cereal at said predetermined time being sufficient to cause the cereal to substantially contact and close substantially all of the pores of the container with said closing of the pores at said predetermined time thus preventing any substantial amount of additional hot water from passing from the excess volume of hot water outside the container to the cereal inside the container; said predetermined time being that time when the cereal reaches its fully cooked state and not before it reaches its fully cooked state and not after it reaches its fully cooked state, such that the cereal is not under cooked, that is runny, or overcooked, that is too thick.

2. The package of claim 1 wherein the said volume of the container is a set constant volume or the said volume of the container is the volume assumed by the container when in a fully expanded configuration thereof, as expanded by the fully cooked and expanded cereal.

3. The package of claim 2 wherein the container is in the form of a flexible bag and the said volume of the container is the volume of the flexible bag when the flexible bag is fully expanded by the fully cooked and expanded cereal.

4. The package of claim 1 wherein hot water resistant material is resistant to boiling water and is made of a natural or synthetic material.

5. The package of claim 1 wherein the pores of the container are constituted by natural openings in the resistant material.

6. The package of claim 5 wherein the resistant material is a hot water resistant paper and the pores are constituted by the natural openings of the paper.

7. The package of claim 1 wherein the pores of the container are constituted by openings fabricated into the resistant material.

8. The package of claim 7 wherein the resistant material is a woven or non-woven fabric and the openings are constituted by the openings inherent in fabricating the fabric.

9. The package of claim 8 wherein the fabric is composed of synthetic yarns.

10. The package of claim 1 wherein the pores of the container are constituted by openings perforated in the resistant material.

11. The package of claim 10 wherein the resistant material is a film and the openings are constituted by perforations through the film.

12. The package of claim 1 wherein the resistant material may be disposed in boiling water for up to one hour without substantial deterioration thereof.

13. The package of claim 1 wherein the granular cereal is in the form of natural grains of the cereal or in the form of rolled or ground particles thereof.

14. The package of claim 13 wherein the cereal is in the form of a grit.

15. The package of claim 1 wherein the cereal is one or more of barley, corn, oats, rice and wheat.

16. The package of claim 1 wherein the cereal contains flavorings.

17. The package of claim 16 wherein the flavorings are one or more of sugar, salt, spices, fruits and nuts.

18. The package of claim 1 wherein the volume of the uncooked cereal disposed in the container is such that upon being fully cooked and expanded the pores of the container are sufficiently closed that the cooked cereal disposed in container may remain in the excess volume of hot water for a time period of up to three hours without substantially being over cooked.

19. The package of claim 18 wherein the time period is up to two hours.

20. The package of claim 18 wherein the time period is up to one hour.

21. The package of claim 18 wherein the time period is up to one-half hour.

22. The package of claim 1 wherein the ratio is 4:1 to 7:1.

23. The package of claim 22 wherein the ratio is 5:1 to 6:1.

24. The package of claim 23 wherein the ratio is about 5.6:1.

25. The package of claim 1 wherein the average pore diameter is less than about 2 millimeters.

26. The package of claim 25 wherein the said diameter is less than about 1 millimeter.

27. The package of claim 26 wherein the said diameter is less than about 0.5 millimeter.

28. The package of claim 27 wherein the said diameter is greater than about 0.1 millimeter.

29. The package of claim 28 wherein the said diameter is greater than about 0.2 millimeter.

30. The package of claim 1 wherein the overall porosity of the container is at least that equal to a permeable membrane.

31. The package of claim 30 wherein the overall porosity is up to that equal to an open netting.

32. The package of claim 1 wherein the cereal is corn.

33. The package of claim 32 wherein the corn is in grit form.

34. A method for the automatic control of the degree of cooking of a cereal, comprising disposing the package of claim 1 in an excess volume of hot water, allowing the package to remain in the hot water until fully cooked, removing the package from the hot water, opening the package and recovering the cooked cereal for serving.

35. The method of claim 34 wherein the package remains in the hot water for a period of time up to three hours.

36. The method of claim 35 wherein the time period is up to two hours.

37. The method of claim 36 wherein the time period is up to one hour.

38. The method of claim 37 wherein the time period is up to ½ hour.

39. The package of claim 1 wherein the container is a closed walled vessel made of a porous hot water resistant material, the pores of which have sizes such that a substantial amount of uncooked granular cereal contained in the vessel cannot pass through said pores but water may freely pass therethrough, and a handle is disposed on at least one of said walls, said handle being constituted by an excess portion of said resistant material in the form of a flap, which flap is of a size that the flap may be engaged by a cooking utensil and the vessel may be lifted and manuevered thereby.

* * * * *